United States Patent [19]

MacInnes et al.

[11] Patent Number: 4,474,484

[45] Date of Patent: Oct. 2, 1984

[54] SEMI-FLOATING BEARING

[75] Inventors: Hugh MacInnes, La Canada; Andrew E. Johnston, Granada Hills, both of Calif.

[73] Assignee: Roto-Master Inc., North Hollywood, Calif.

[21] Appl. No.: 404,633

[22] Filed: Aug. 2, 1982

[51] Int. Cl.³ ............................................. F16C 27/08
[52] U.S. Cl. .............................. 384/215; 308/DIG. 4
[58] Field of Search ............... 384/215, 218, 220, 223; 308/DIG. 4, 184 R, 184 A

[56] References Cited

U.S. PATENT DOCUMENTS 2,857,974 10/1958 Heller .................................. 384/215
3,043,636 7/1962 MacInnes et al.
4,204,718 5/1980 Bosco ........................... 308/DIG. 4

Primary Examiner—Lenard A. Footland
Attorney, Agent, or Firm—Cislo, O'Reilly & Thomas

[57] ABSTRACT

An improved floating bearing for turbochargers and similar high speed rotating machinery is axially restrained by the interposition of a spring washer between the flange on the floating bearing and a seal plate attached to the housing that carries the bearing and a shaft rotatable therein. The spring biasing means is configured as an annular washer having openings therethrough, preferably in the outer perimeter thereof, to increase the flexibility of the washer. The interior portion of the washer acts against the flange of the floating bearing while the exterior portion of the washer is held relative to the housing in radial displacement from the bearing flange.

15 Claims, 4 Drawing Figures

SEMI-FLOATING BEARING

BACKGROUND OF THE INVENTION

This invention relates to methods of operating turbochargers and similar high speed rotating machinery, and to a unique design for a semi-floating bearing apparatus used therein.

Turbochargers are well-known in the prior art and conventionally utilize a turbine wheel and a compressor impeller mounted on a unitary or common shaft. The turbine wheel and compressor are carried within their respective housings and are rotated at high speeds by the shaft.

The operating components of turbochargers and other high speed rotating machinery are subjected to extraordinary forces and destructive vibrations which do not occur in machinery operated at lower speeds. The shafts of turbochargers typically rotate at speeds of 125,000 r.p.m. and above. At such speeds severe destructive vibrations occur as a result of a static inbalance of the shaft and other components. Accordingly, it has been necessary to employ floating or semi-floating bearings in such high speed machinery.

U.S. Pat. No. 3,043,636 describes a floating bearing arrangement in a turbocharger. In the machinery described, the turbocharger shaft is rotatable within a bearing having a generally tubular configuration with a radial flange at one end. The bearing is carried within a sleevelike structure formed in a housing within which the shaft is mounted for rotation. Lubricating oil under a pressure of 30 p.s.i., for example, is continuously introduced into the turbocharger housing and forms a lubricating film between the bearing and the rotating shaft and also between the bearing and the surrounding sleevelike structure of the housing. Ideally, the bearing "floats" within the housing and the shaft "floats" within the bearing. The bearing itself must be restrained from rotation and from moving axially without interfering with its ability to float on the oil film. The oil film dampens vibrations which would otherwise cause instability, particularly at or near the natural frequency of the rotating shaft and components coupled in rotation therewith.

Rotational movement of a floating bearing can be prevented by utilizing a dowel pin which extends parallel to the rotating shaft through an eccentric hole in the flange of the bearing. The ends of the dowel pin are captured by the housing so that the bearing cannot rotate. Alternatively, a pocket may be formed in the housing to receive a bearing flange with an irregular shape.

Axial movement of floating bearings has been limited by a retaining ring mounted in the housing or by bosses protruding from a seal plate. Retaining rings tend to allow excessive longitudinal reciprocation of the floating bearing. The bosses on sealing plates are unsatisfactory if they are in intimate contact with the bearing flange because the minute movement between the sealing plate boss and the bearing flange causes extreme fretting with a subsequent increase in axial play of the bearing.

One solution which has been attempted is to interpose a steel or teflon shim between the protruding boss of the seal plate and the bearing flange. This shim does reduce fretting, but has the undesirable effect of increasing the tolerance stack-up between the parts. That is, the tolerance of manufacture of each of the component parts is cumulative so that the possible maximum end play of the bearing, and therefore the rotating shaft, is increased.

The invention relates to a method of axially restraining movement of a floating bearing carried in a pressurized liquid lubricant in a high speed, rotary machine. As with conventional turbochargers and other high speed machines, the invention employs a shaft which is rotatable within a floating bearing that has a radial flange. The bearing is disposed within a housing and is supplied with liquid lubricant that flows between the shaft and the bearing and between the bearing and the housing. A retainer is provided to act between the housing and the bearing flange to restrain axial movement of the bearing within the housing. The improvement of the invention resides in the interposition of a spring washer between the bearing flange and the retainer so that the spring washer acts upon the bearing and the retainer acts upon the spring washer at a radial displacement from the bearing flange.

OBJECTS AND SUMMARY OF THE INVENTION

It is an object of the invention to provide a unique manner of restraining longitudinal movement of a floating bearing in a turbocharger or other high speed rotating machine utilizing the unique floating bearing assembly.

Another very important object of the invention is to provide longitudinal restraint of a floating bearing in high speed rotating machinery without interfering with the dampening effect exerted by the lubricating oil in which the bearing floats.

Another important object of the invention is to relieve force from the pressurized liquid lubricant in a turbocharger or other high speed machine which otherwise acts on the floating bearing in opposition to the spring bias of the novel floating bearing assembly of the invention.

It is a further and more specific object of the invention to restrain longitudinal movement of a floating bearing in a high speed rotating machine while at the same time reducing the end play of the bearing and without resorting to extremely close tolerances of the bearing assembly components.

Another even further more specific object of the invention is to provide longitudinal restraint in a floating bearing assembly while avoiding the close fits characteristic of prior art longitudinal restraint systems.

Another and further specific object of the invention is to provide a longitudinal restraint system in a floating bearing assembly which will allow closer face clearances on both the turbine wheel and the compressor impeller. That is, by avoiding the tolerance stack-up characteristic of prior art devices, the clearance between the turbine wheel and the surface of the housing adjacent thereto, and the clearance between the compressor impeller and the housing surface adjacent thereto, can be reduced resulting in performance improvement.

A further and even more specific object of the invention is to provide a cost savings in manufacture of turbocharger components by accommodating components having greater manufacturing tolerances, as contrasted with prior art systems and methods, without an undesireable increase in end play in a floating bearing assembly.

Generally, in an exemplary embodiment, the invention employs a floating bearing apparatus for surrounding a shaft rotatable within a housing comprising a bearing body having a tubular portion with an annular flange at one end thereof, an annular spring biasing mechanism, such as a spring washer, and an axial restraining mechanism, such as a seal plate, arranged together so that the spring biasing mechanism is interposed between the bearing body flange and the axial restraint mechanism, and the axial restraint mechanism acts upon the spring biasing mechanism at a radial displacement from the location at which the spring biasing mechanism acts upon the bearing body.

The foregoing objects of the invention, and the exemplary embodiments thereof, will become more apparant from the illustrative following commentary taken in conjunction with the figures of the drawings.

DESCRIPTION OF THE BEST EMBODIMENTS CONTEMPLATED

Figure 1:
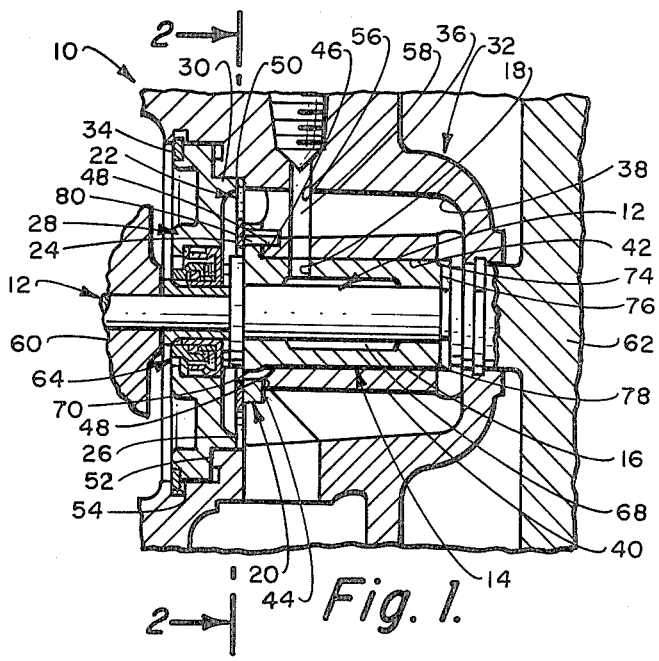
FIG. 1 is a sectional side elevational view of a floating bearing assembly according to the invention as used in a turbocharger.

Referring to the drawing figures, wherein like numerals of reference designate like elements throughout, a portion of an otherwise conventional turbocharger 10 is depicted. The turbocharger 10 employs a cylindrical shaft 12, with collars and lands thereon as depicted, rotatably mounted within a floating bearing 14. The floating bearing 14 is a body having a tubular portion 16 with radial passageways 18 defined therethrough to allow the passage of lubricating liquid. The bearing 14 has a radial, annular flange 20 at one end of the tubular portion 16. An annular spring washer 22 has an interior portion 24, depicted in FIG. 2, which overlaps the bearing flange 20, and an exterior portion 26 extending therebeyond. An axial restraining seal plate 28 with an annular boss 30 is secured to the turbocharger housing 32 by means of a snap ring retainer 34. The boss 30 of the seal plate 28 is engageable with the exterior portion 26 of the spring washer 22 in radial displacement from the flange 20 of the bearing body 14.

The turbocharger housing 32 is a conventional machined, metal structure which includes a casing 36 which defines a hollow cavity 38. Within the cavity 38 the housing 32 further includes a sleevelike member 40 which encircles the tubular portion 16 of the bearing 14. The housing sleeve 40 has a curved, cylindrical surface 42 which envelopes the tubular portion 16 the bearing 14. The housing sleeve 40 also includes a transverse, radial surface 44 disposed in face to face arrangement with the annular surface 46 of the bearing flange 20. A chamfer 48 is defined at the intersection of the interiorally curved sleeve surface 42 and the radial surface 44 of the sleeve. The purpose of the chamfer 48 will become apparant in the later description of the operation of the embodiments depicted.

The housing casing 36 is constructed with an annular shoulder 50 disposed radially outwardly from the bearing flange 20. The housing casing 36 also defines another shoulder 52 of greater diameter than the shoulder 50, and a radially extending groove 54 for receiving the retaining ring 34.

A radially extending lubricating oil inlet passage 56 is formed in the structure of the housing casing 36, and is tapped at the radially external extremity thereof to receive a lubricating oil fitting (not shown). An oil inlet tube 58 extends from the inlet passageway 56 to the wall of the sleeve 40 of the housing 32 to supply lubricating oil to the bearing 14.

The shaft 12 is mounted for high speed rotation within the bearing 14. A compressor impeller 60 is mounted at one end of the shaft 12 and a turbine wheel 62 is mounted at the opposite end of the shaft 12. The shaft 12, compressor impeller 60, and turbine wheel 62 are all common structures widely used in conventional turbochargers. Likewise, the seal 64 between the compressor wheel 60 and the annular seal plate 28 may be one of several commercially available high speed seals.

The seal plate 28 is an annular structure, the outer periphery of which is held in place against the shoulder 52 of the housing casing 32 by means of the snap retainer ring 34. The retainer ring 34 seats in the groove 54 in the housing casing 32 and longitudinally immobilizes the seal plate 28. The annular boss 30 on the opposite side of the seal plate 28 bears against the exterior portion 26 of the annular spring washer 22 and immobilizes the exterior portion 26 against the shoulder 50 of the housing casing 36.

Figure 2:
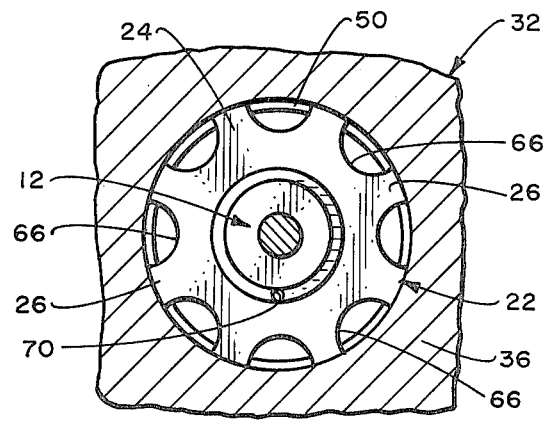
FIG. 2 is a transverse, sectional elevational view taken along the lines 2—2 of FIG. 1.

As best depicted in FIG. 2, a spring washer 22 is a metallic structure with openings defined therethrough as arcuate gaps or notches 66 formed in the outer perimeter of the exterior portion 26 of the spring washer 22. Alternatively, openings could be defined through the structure of the spring washer 22 interiorally of the outer perimeter thereof. The function of the openings formed by the gaps 66 is to increase the flexibility of the spring washer 22. The size and the number of openings will vary with the various embodiments of turbochargers 10 or other high speed machines.

The exterior portion 26 of the spring washer 22 is received by the shoulder 50, as depicted in FIG. 1. The outer diameter of the spring washer 22 is smaller than the outer diameter of the shoulder 50 so that the spring washer 22 will not bind in the shoulder 50 as it flexes with the bearing 14.

The spring washer 22 is held in place by the boss 30 of the seal plate 28. The seal plate 28 bends the spring washer 22 slightly, so that the interior portion 24 of the spring washer 22 presses on the flange 20 of the bearing 14 enough to prevent axial movement of the bearing 14 which would occur with normal thrust caused by the rotor. The axial force exerted by the spring washer 22 is not so great as to create a substantial frictional force which would prevent slight radial movement of the bearing 14. Because the force exerted on the flange 20 of the bearing 14 by the spring washer 22 is slight, the bearing 14 floats on a film of lubricating oil between the outer surface of the bearing 14 and the curved surface 42 of the housing sleeve 40.

The central region of the tubular portion 16 of the bearing 14 is separated from the shaft 12 by an annular oil recess 68 therebetween. Even at the ends of the tubular portion 16 of the bearing 14, however, there is a narrow clearance so that a film of lubricating oil exists between the rotary shaft 12 and the surface of the bearing 14. The lubricating oil is introduced under pressure through the oil inlet passageway 56 and the oil inlet tube 58. Oil passes through a radial aperture in the housing sleeve 40 and enters the interstice 68 through the equally spaced apertures or passageways 18 defined in the wall of the tubular portion 16 of the bearing 14. The apertures 18 serve as liquid lubricant passageways and freely admit the pressurized oil to the recess 68.

The outer diameter of the radial flange 20 is larger than the inner diameter of the annular spring washer 22, so that the interior portion of the spring washer 22 bears against the radial flange 20 to longitudinally immobilize the bearing 14. A portion of the pressurized lubricating oil flows in a film between the mating curved surfaces of the tubular portion 16 of the bearing 14 and the interior curved surface 42 of the housing sleeve 40 and flows past the radial, mutually abutting surfaces 44 of the sleeve 40 and 46 of the flange 20. As previously noted, an annular chamfer 48 is defined at the intersection of the sleeve surfaces 42 and 44 and faces the juncture of the tubular portion 16 and the radial flange 20 of the bearing 14.

The annular cavity provided between the bearing 14 and the sleeve 40 by the chamfer 48 facilitates the radial flow of fluid from between the bearing 14 and the sleeve 40. This serves to relieve force from the pressurized oil which acts on the floating bearing 14 in opposition to the bias of the spring washer 22. That is, oil entrapped between the abutting surfaces 44 of the sleeve 40 and 46 of the flange 20 would tend to bear against the flange 20 and force the bearing 14 axially to the left, as viewed in FIGS. 1 and 3. The chamfer 48 provides an annular channel which serves to relieve this force.

The axial force is further relieved by the provision of at least one relief passage 70 defined through the structure of the flange 20 and extending axially, offset from and parallel to the shaft 12. The relief passage 70 thereby serves as a readily accessible vent for the film of oil flowing toward the flange 20 between the sleeve 40 and the tubular portions 16 of the bearing 14.

Figures 3, 4:
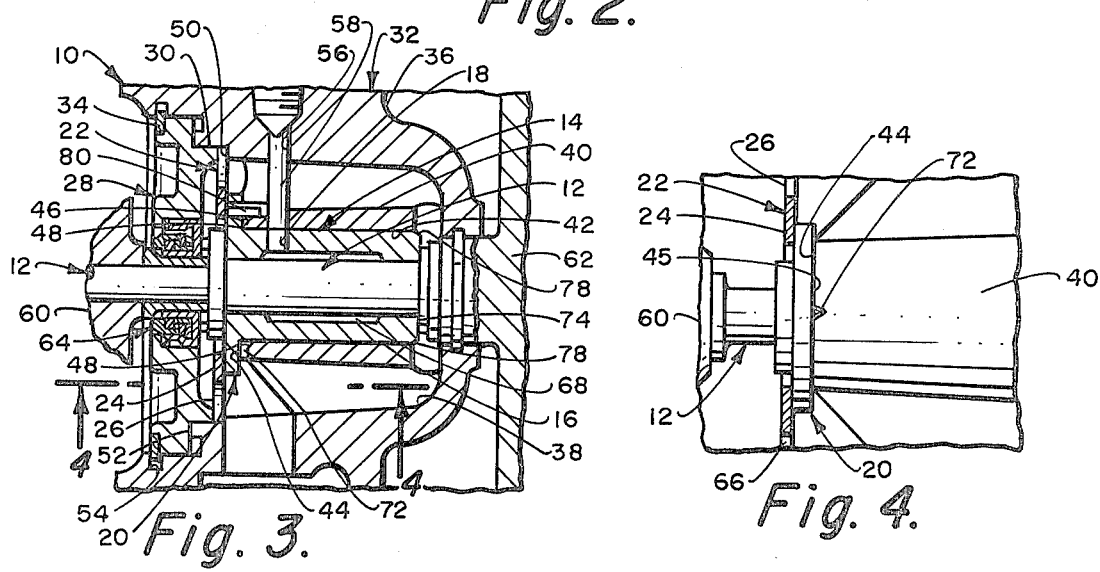
FIG. 3 is a side, sectional elevational view of one alternative embodiment of the invention.
FIG. 4 is a bottom sectional view taken along the lines 4—4 of FIG. 3.

The embodiment of FIGS. 3 and 4 is similar in most respects to the embodiment of FIGS. 1 and 2, and corresponding structural elements bear the same reference numerals. One significant difference in the embodiment of FIGS. 3 and 4 from that depicted in FIGS. 1 and 2 is that instead of the relief passageway 70 defined through the flange 20 of the bearing 14, a relief channel 72 is instead defined in the radial surface 44 at the end of the housing sleeve 40 facing the radial surface 46 of the bearing flange 20. The relief channel 72 is a radially extending groove defined in the surface 44 and has a V-shaped cross section, as depicted in FIG. 4.

The flow of lubricating oil, instead of being channeled through the longitudinal passageway 70 as in the embodiment of FIGS. 1 and 2, is instead channeled radially from between the sleeve 40 and the flange 20. In both embodiments the result is to relieve force from the pressurized oil which would otherwise tend to act in opposition to the spring washer 22 and force the bearing 14 to the left, as viewed in FIGS. 1 and 3.

In both the embodiment depicted in FIGS. 1 and 2, and the alternative embodiment depicted in FIGS. 3 and 4, the remote end 74 of the tubular portion 16 of the bearing 14 is chamfered. In the embodiment of FIGS. 1 and 2, the end 74 is chamfered both radially interiorally at 76, and radially exteriorally at 78. In the embodiment of FIGS. 3 and 4 the radially interior chamfer 76 has been omitted.

The bearing 14 is chamfered at the end 74 remote from the flange 20 to facilitate the passage of the pressurized lubricating oil. By facilitating passage at the remote end 74, there is less of a tendency for the lubricating oil to seek a path of flow between the abutting surfaces 44 and 45 of the sleeve 40 and flange 20, respectively. By facilitating flow in the opposite direction the force tending to urge the flange 20 and sleeve 40 apart is diminished.

The embodiment of FIGS. 1-2, and also the embodiment of FIGS. 3-4, provide a method and apparatus for axially restraining movement of the floating or semifloating bearing 14 which carries the rotating shaft 12 in a pressurized liquid lubricant within the housing 32. Axial restraint is achieved in both embodiments by spring biasing the floating bearing 14 against the axial thrust of the rotating shaft 12, using the spring washer 22 hereinbefore described. The bearing 14 is immobilized from rotation relative to the housing 32 by a conventional dowel pin 80 which passes through a hole in the flange 20 and is secured to the housing 32. Also, both embodiments of the invention depicted herein relieve force from the pressurized oil which tends to act on the floating bearing 14 in opposition to the spring bias of the spring washer 22.

Those of ordinary skill in the art will at once recognize various changes and modifications from those which have been disclosed, but all such changes and modifications will not depart from the essence of the invention as disclosed herein and all such changes and modifications are intended to be covered by the appended claims.

In the claims

1. In a machine employing shaft means rotatable within a floating bearing that has a radial flange and is disposed within a housing and which is supplied with liquid lubricant that flows between said shaft means and said bearing and between said bearing and said housing, and including retaining means acting between said housing and said bearing flange to restrain axial movement of said bearing within said housing, the improvement comprising a spring washer interposed between said bearing flange and said retaining means so that said retaining means acts upon said spring washer at a radial displacement from said bearing flange.

2. In a machine according to claim 1 the improvement wherein said spring washer is an annular structure with openings defined therethrough.

3. In a machine according to claim 2 the improvement wherein said openings are formed by gaps in the outer perimeter of said spring washer.

4. In a machine according to claim 1, the further improvement wherein said bearing flange is formed with at least one axially offset relief opening defined therethrough.

5. In a machine according to claim 1, the further improvement wherein said housing structure encircles said bearing and defines a radial surface with a radial relief channel in said radial surface facing said bearing flange.

6. In a machine according to claim 1, the further improvement wherein said housing structure defines a curved surface encircling said bearing and a radial surface facing said bearing flange, and a chamfer at the intersection of said curved surface and said radial surface.

7. In a machine according to claim 6, the further improvement wherein said bearing includes a tubular portion with said flange at one end and an opposite, remote, chamfered end.

8. In a machine according to claim 7, the further improvement wherein said opposite, remote end of said tubular bearing portion is chamfered both radially interiorly and exteriorly.

9. A floating bearing apparatus for surrounding a shaft rotatable within a housing comprising:
  a bearing body having a tubular portion with radial liquid lubricant passageways defined therethrough and with an annular flange at one end of said tubular portion,
  an annular spring biasing means having an interior portion overlapping said body flange, and an exterior portion extending therebeyond, and
  axial restraining means for securement to said housing and engageable with said exterior portion of said annular spring biasing means in radial displacement from said body flange.

10. A floating bearing apparatus according to claim 9 in which said spring biasing means is a spring washer with openings defined in said exterior portion.

11. A floating bearing apparatus according to claim 10 in which at least one relief passage is defined in said body flange.

12. A floating bearing apparatus according to claim 9 further comprising a sleeve on said housing encircling said tubular portion of said bearing body and residing in abutment with said bearing body flange, and defining at least one radial channel facing said flange.

13. A floating bearing apparatus according to claim 12 in which said sleeve is chamfered where it faces the juncture of said tubular portion and said flange of said bearing body.

14. A floating bearing apparatus according to claim 9 in which said tubular portion of said bearing body is chamfered both internally and externally at its end opposite said flange.

15. A floating bearing apparatus according to claim 9 in which said housing defines an annular shoulder disposed radially outwardly from said bearing body flange and said spring biasing means is an annular spring washer, the exterior portion of which is received by said shoulder and the outer diameter of which is smaller than the outer diameter of said shoulder.

* * * * *